No. 690,760. Patented Jan. 7, 1902.
E. S. OLIVER.
COOKING UTENSIL.
(Application filed Feb. 23, 1901.)
(No Model.)
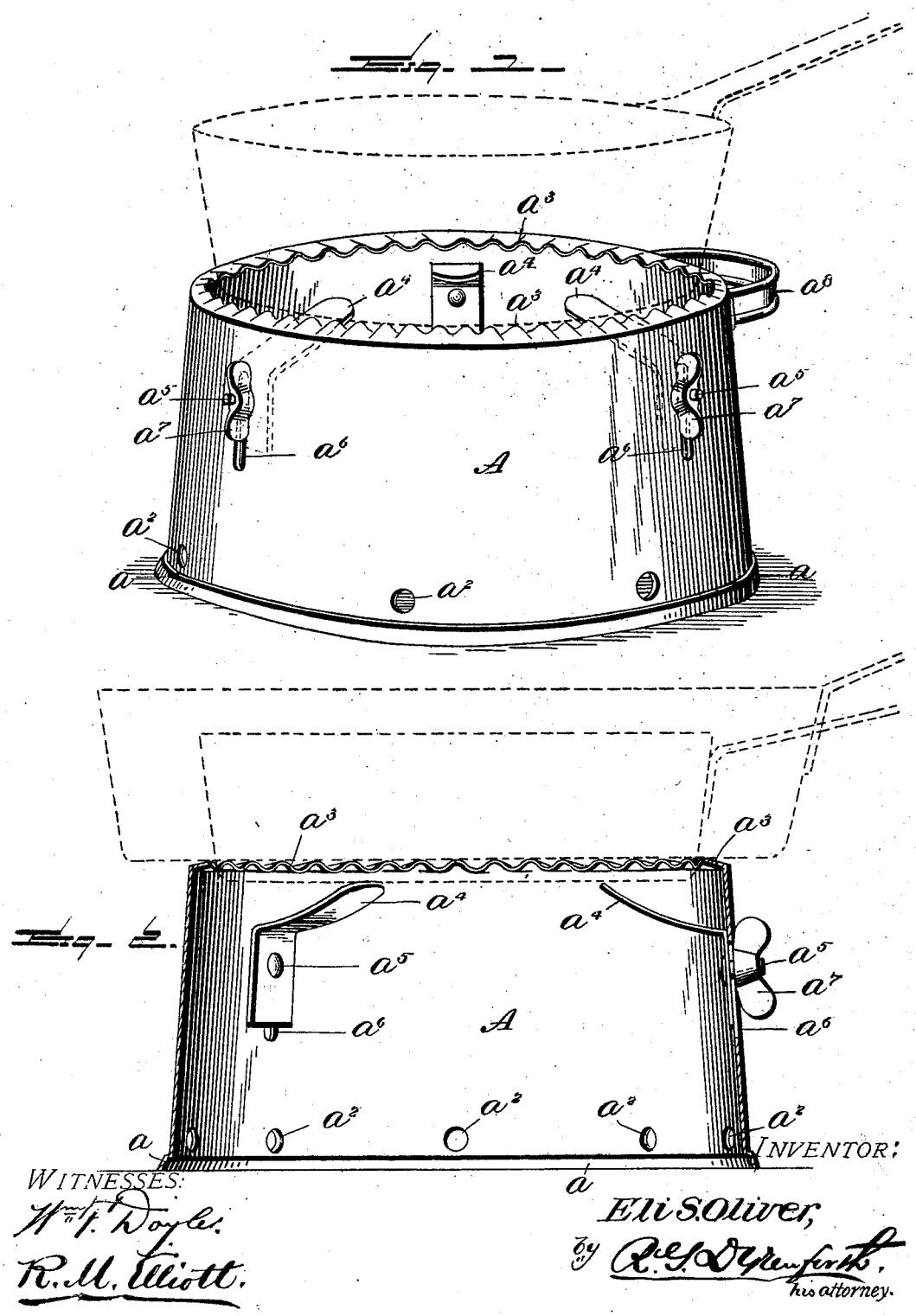
WITNESSES:
INVENTOR:
Eli S. Oliver,
by his attorney.

UNITED STATES PATENT OFFICE.

ELI S. OLIVER, OF DIXFIELD, MAINE.

COOKING UTENSIL.

SPECIFICATION forming part of Letters Patent No. 690,760, dated January 7, 1902.

Application filed February 23, 1901. Serial No. 48,535. (No model.)

*To all whom it may concern:*

Be it known that I, ELI S. OLIVER, a citizen of the United States, residing at Dixfield, in the county of Oxford and State of Maine, have invented certain new and useful Improvements in Cooking Utensils; and I do hereby declare the following to be a full, clear, and exact description of the invention, such as will enable others skilled in the art to which it appertains to make and use the same.

This invention relates to cooking utensils.

The object is to present a simple utensil used for cooking in which rapid cooking of substances may be effected without danger of burning and in which all of the heat in a zone inclosed by the utensil when placed on a stove will be utilized.

In carrying my invention into effect I employ an open-ended cylinder or truncated cone, constructed, preferably, of sheet metal and having near its base a plurality of openings through which air is admitted and its top portion incut or crimped to permit escape of heat between the utensil and the vessel placed thereon.

As a matter of further and specific improvement I combine in the utensil a plurality of adjustable supports by which a utensil of small size may be supported, and, further, if desired, these supports may be used to elevate the utensil placed thereon at a greater height above the heat.

The invention consists in the novel construction and combination of parts of a cooking utensil, as will be hereinafter fully described and claimed.

In the accompanying drawings, forming a part of this specification, and in which like letters of reference indicate corresponding parts, I have illustrated a form of embodiment of my invention capable of carrying out my objects, it being understood that other forms of embodiment thereof may be employed without departing from the spirit of the same, and in these drawings—

Figure 1 is a view in perspective exhibiting the utensil as it appears when ready for use, and Fig. 2 is a view in section showing the manner in which the supports are assembled with relation to the body of the device.

Referring to the drawings, A designates the utensil, the same consisting of a cylinder of sheet metal open at both ends and having by preference at its base a beaded or flared edge $a$; but this is not essential and may therefore be omitted. Arranged near the lower edge of the base is a series of openings $a^2$, through which when the device is placed upon a stove atmospheric air will pass, thereby to temper the heat and prevent burning of the food material being cooked. The upper edge of the utensil is by preference inturned and crimped, as shown at $a^3$, the crimps being provided for the purpose of permitting the heat to escape between the cooking utensil and the device, this crimped edge being formed by turning in a flange at the upper edge of the device and crimping this flange. It is to be understood that the edge may be straight and be provided with a crimp, or the edge may be straight and be provided with recesses or inturned and provided with recesses, or a supplemental piece of crimped metal may be secured to this edge, the object in each case being to provide for proper circulation of heated air.

Mounted for movement against the inner walls of the body is a series of supports $a^4$, approximately L-shaped in elevation, these supports being held in position by screws $a^5$, passing through vertical slots $a^6$, provided in the sides of the body, thumb-nuts $a^7$ or the like, engaging the screws $a^5$, serving to clamp the supports in the desired position. Where the bottom of a vessel is of sufficient area to cover the top of the device, the employment of these supports will be rendered unnecessary, and they may be moved down below the plane of the bottom of such vessel; but, where a vessel, the bottom of which is smaller than the top of the device, is to be used for cooking purposes, these supports will then be raised to present rests for such vessel. The supports may be secured on the outside of the device and perform the function described. The device is provided with a handle $a^8$, which may be straight, as shown, or an ordinary looped handle, or, if preferred, two handles on opposite sides of the device may be provided.

In use the device is placed upon a stove and the utensil containing the food to be cooked is placed on top, as indicated in dotted lines in both figures. The heat inclosed in the zone covered by the device will be caused to impinge directly against the vessel containing the food, thereby focusing the heat and securing from it the highest results. From the fact that radiated heat instead of direct heat is employed in the use of this device any article of food being cooked will not be burned, so that, for example, in cooking breakfast-foods, such as rolled or crushed cereals, it will not be necessary to employ a double boiler, as usual.

The device is adapted for supporting large or small cooking utensils. By reason of its simplicity of construction it may be readily and cheaply manufactured and in use will be found to fill a long-felt want.

Having thus fully described my invention, what I claim as new, and desire to secure by Letters Patent of the United States, is—

1. A device of the character described, comprising a body portion provided, near its base, with a plurality of openings, and at its top with a crimped or fluted supporting edge, and supports connected with the body portion, substantially as described.

2. A device of the character specified, comprising an open-ended body portion provided, near its base, with a plurality of openings, and at its top with a crimped or fluted supporting edge, and supports adjustably connected with the body portion, substantially as described.

3. A device of the character specified, comprising an open-ended body portion provided near its base with a plurality of openings, and at its top with a crimped or fluted supporting edge, supports adjustably connected with the body portion, and a handle secured to the body, substantially as described.

In testimony whereof I affix my signature in the presence of two subscribing witnesses.

ELI S. OLIVER.

Witnesses:
   MANDEVILLE HOLMAN,
   WILLIS W. WAITE.